United States Patent
Campbell

(10) Patent No.: US 7,549,440 B1
(45) Date of Patent: Jun. 23, 2009

(54) VALVE POSITION INDICATOR FOR BURIED VALVES

(76) Inventor: Todd W. Campbell, 5255 Malvern, Apt. D, Buena Park, CA (US) 90621

(*) Notice: Subject to any disclaimer, the term of this patent is extended or adjusted under 35 U.S.C. 154(b) by 583 days.

(21) Appl. No.: 11/421,311

(22) Filed: May 31, 2006

Related U.S. Application Data

(60) Provisional application No. 60/719,510, filed on Sep. 22, 2005.

(51) Int. Cl.
*F16K 37/00* (2006.01)
(52) U.S. Cl. .................. 137/553; 116/277; 116/DIG. 21
(58) Field of Classification Search ............... 137/553, 137/551; 116/277, DIG. 21
See application file for complete search history.

(56) References Cited

U.S. PATENT DOCUMENTS

| | | | | |
|---|---|---|---|---|
| 3,002,529 | A | * 10/1961 | Bowman | 137/553 |
| 3,878,862 | A | * 4/1975 | Blanton | 137/553 |
| 4,653,531 | A | * 3/1987 | Gain, Jr. | 137/556 |
| 4,718,445 | A | 1/1988 | Lundberg et al. | |
| 5,224,512 | A | * 7/1993 | Nogami et al. | 137/554 |
| 6,019,129 | A | 2/2000 | Taha | |
| 6,182,696 | B1 | 2/2001 | Rainwater et al. | |
| 6,206,023 | B1 | 3/2001 | Landers | |
| 6,244,296 | B1 | 6/2001 | Lafler et al. | |
| 6,260,820 | B1 | 7/2001 | Chowdhury | |
| 6,302,132 | B1 | 10/2001 | Lay | |
| 6,484,751 | B2 | 11/2002 | Lafler et al. | |
| 6,536,293 | B2 | 3/2003 | Shiba | |
| 6,783,113 | B2 | 8/2004 | Schommer | |
| 6,871,665 | B2 | * 3/2005 | Hannah et al. | 137/553 |
| 2001/0027812 | A1 | 10/2001 | Lafler et al. | |

* cited by examiner

*Primary Examiner*—Kevin L Lee
(74) *Attorney, Agent, or Firm*—Knobbe, Martens, Olson & Bear, LLP

(57) ABSTRACT

A valve position indicator is directly coupled to a valve shaft. The indicator has a gauge that directly indicates rotation of a valve shaft in a subterranean valve.

13 Claims, 5 Drawing Sheets

VALVE POSITION INDICATOR FOR BURIED VALVES

CROSS-REFERENCE TO RELATED APPLICATIONS

The present application is based on and claims the benefit priority under 35 U.S.C. § 119 to U.S. Provisional Application No. 60/719,510, filed on Sep. 22, 2005, the entire contents of which is expressly incorporated by reference herein.

BACKGROUND OF THE INVENTION

1. Field of the Invention

The present invention generally relates to position indicators for buried valves. More specifically, the present invention relates to position indicators that directly relate a position of a valve element, such as a butterfly, plug or the like, of a valve that is buried in the ground.

2. Description of the Related Art

Various types of valves are designed to be buried in the ground. These valves can be used to stop or otherwise control the flow of materials through subterranean pipelines and the like.

One type of valve is considered a quarter-turn valve. There are a number of different versions of the quarter-turn valve, including but not limited to plug valves, ball valves and the like. A quarter-turn valve is so named because the element that controls flow turns one quarter of a revolution between its full open position and its full closed position.

Some quarter-turn valves are very large and heavy. Thus, multiple turn actuators are coupled to the valves through suitable linkages or gear trains. The actuators can be manual actuators or mechanized actuators. In some cases, a hand wheel is mounted to an elongated shaft. The elongated shaft rotates a worm gear at its lower end. The worm gear is positioned in a gear box. The worm gear rotates a gear that is coupled to a valve shaft. The valve shaft is fixed to the element of the valve that occludes or opens the flow passage through the valve. Depending upon the worm gear and gear combination, tens or hundreds of turns of the hand wheel can be required to move the valve element through its quarter-turn sweep.

In many cases, the relative position of the valve element is determined either by counting the number of times the hand wheel is turned or, even more often, simply by the sensory feedback of the field operator. Both of these alternatives can easily lead to catastrophic valve failure. For instance, if the operator loses count of the rotations, which can sometimes number in the hundreds, the operator may damage the valve. Similarly, if the valve operates harder than normal for some reason, the operator may not realize that the valve has not been fully opened and the operator then may damage the valve during a subsequent closing.

To address these concerns, a valve position indicator was previously developed in which an indicator dial was mounted to the elongated shaft that connects the hand wheel to the gear box. Through the use of gearing connected near the actuator (e.g., the hand wheel), the several rotations of the elongated shaft could be translated into movement of an indicator dial from an open indicator position to a closed indicator position.

While this indicator was functional, it had a few drawbacks. For instance, if the gearing broke on the indicator, the indicator would fail to provide a reading. More critically, if part of the drive used on the manual actuator (e.g., the elongated shaft, the worm gear, the gear or the valve shaft) failed, the elongated shaft would continue turning and this would cause movement of the indicator dial, thereby providing a false indication of the valve element position when the breakage occurred.

Some valve and actuator combinations that were designed for above ground use featured a valve element position indicator that was directly coupled to the valve shaft. These indicators would turn through a quarter turn as the valve shaft and the associated valve element turned through its quarter turn. The indicator could take the form of a short tab that was mounted to sweep over a small region on a housing of the actuator. While these indicators were suitable for above ground use, these indicators could not be read in most subterranean applications.

SUMMARY OF THE INVENTION

Thus, a need for an improved valve position indicator for use with quarter turn valves is desired.

One aspect of the present invention involves a valve position indicator. The valve position indicator comprises a gauge. The gauge is supported by a bracket. A tubular housing has a first end connected to the gauge and a second end connected to a valve assembly. The valve assembly comprises a valve shaft. A drive link is positioned within the tubular housing. A first end of the drive link is connected to an indicator of the gauge and a second end of the drive link is directly coupled to the valve shaft such that rotation of the valve shaft results in direct rotation of the drive link.

BRIEF DESCRIPTION OF THE DRAWINGS

These and other features, aspects and advantages of the present invention will now be described with reference to the drawings of a preferred embodiment. The preferred embodiment is intended to illustrate and not to limit the invention. The drawings comprise five figures. Additional images are provided in an appendix attached hereto.

DETAILED DESCRIPTION OF THE PREFERRED EMBODIMENT

Figure 1:
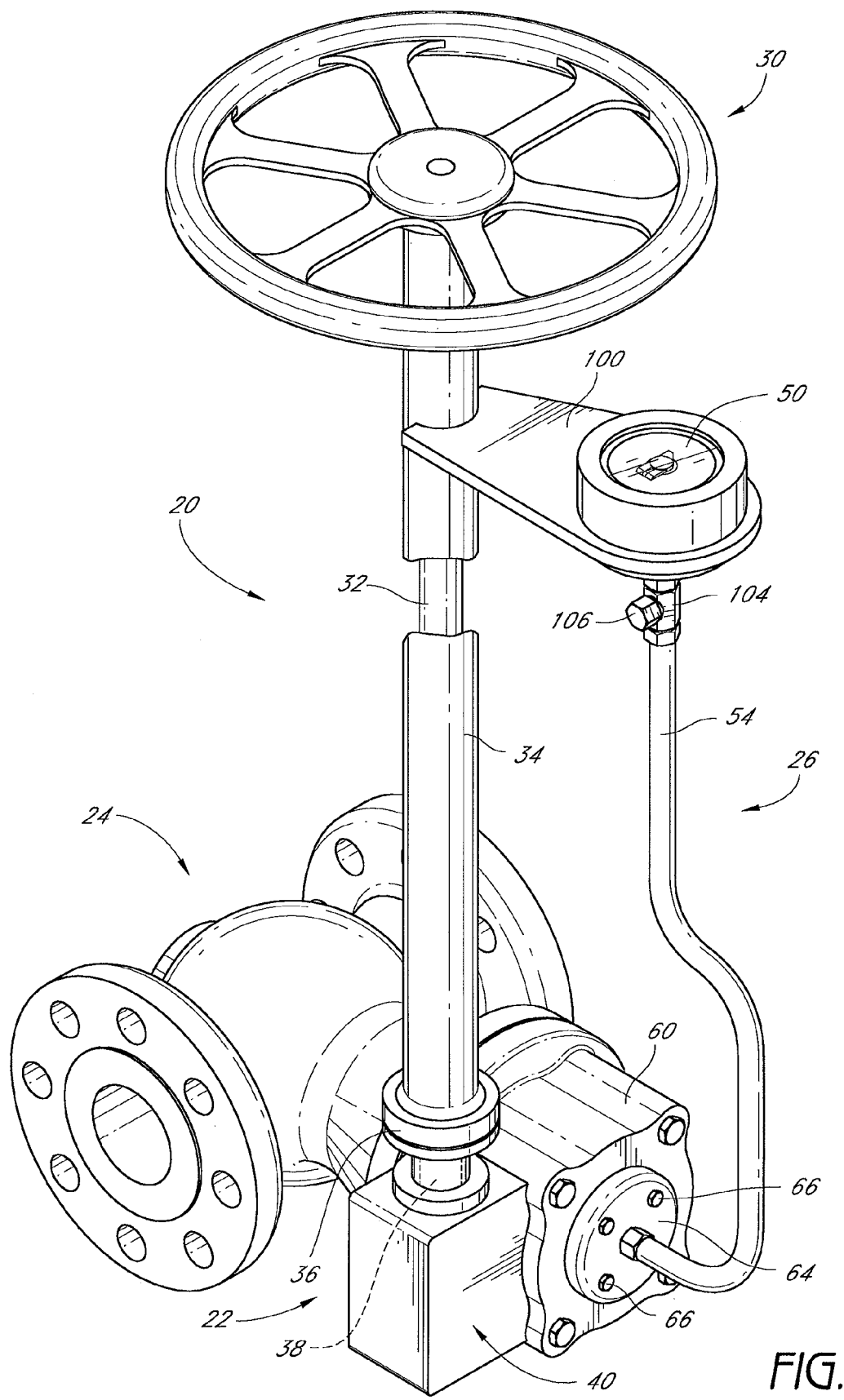
FIG. 1 is a perspective view of a valve, actuator and indicator assembly that is arranged and configured in accordance with certain features, aspects and advantages of the present invention.
Figure 2:
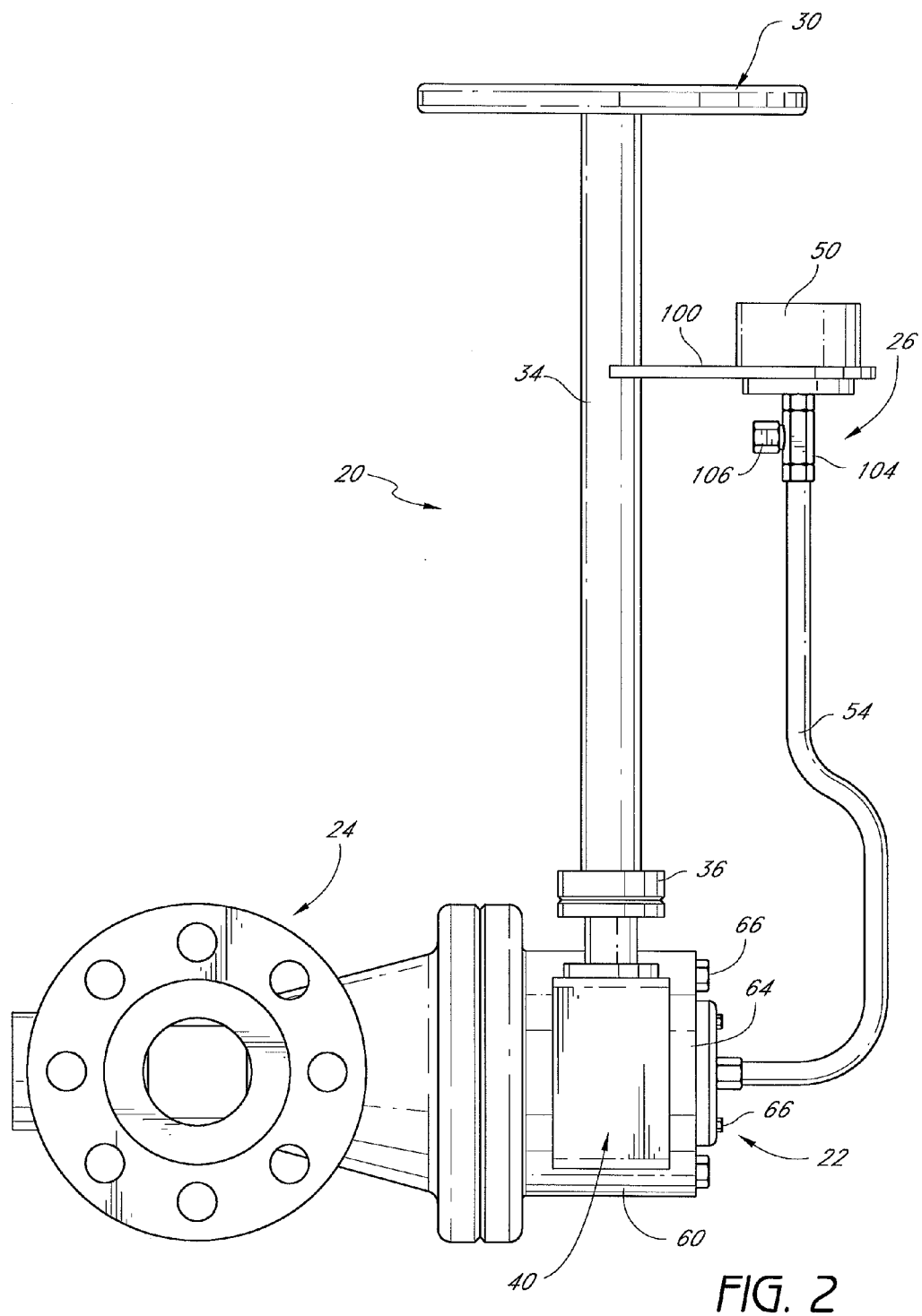
FIG. 2 is a side elevation view of the assembly of FIG. 1.

With reference now to FIG. 1, an assembly 20 is illustrated therein. The illustrated assembly comprises an actuator 22, a valve 24 and a position indicator 26. The present invention primarily relates to the position indicator 26 and its coupling to the valve 24 but the actuator 22 will likely be present in most embodiments of the present invention.

The illustrated actuator 22 comprises a hand wheel 30 that is joined for rotation with an elongated shaft 32. The wheel 30 and the shaft 32 can be coupled in any suitable manner. In one configuration, the wheel 30 is attached to the shaft 32 with a threaded fastener. In another configuration, the wheel 30 is welded to the shaft 32. The connection between the wheel 30 and the shaft 32 can have any suitable configuration and further description of the connection is not needed to understand, make or use the present invention.

Figure 5:
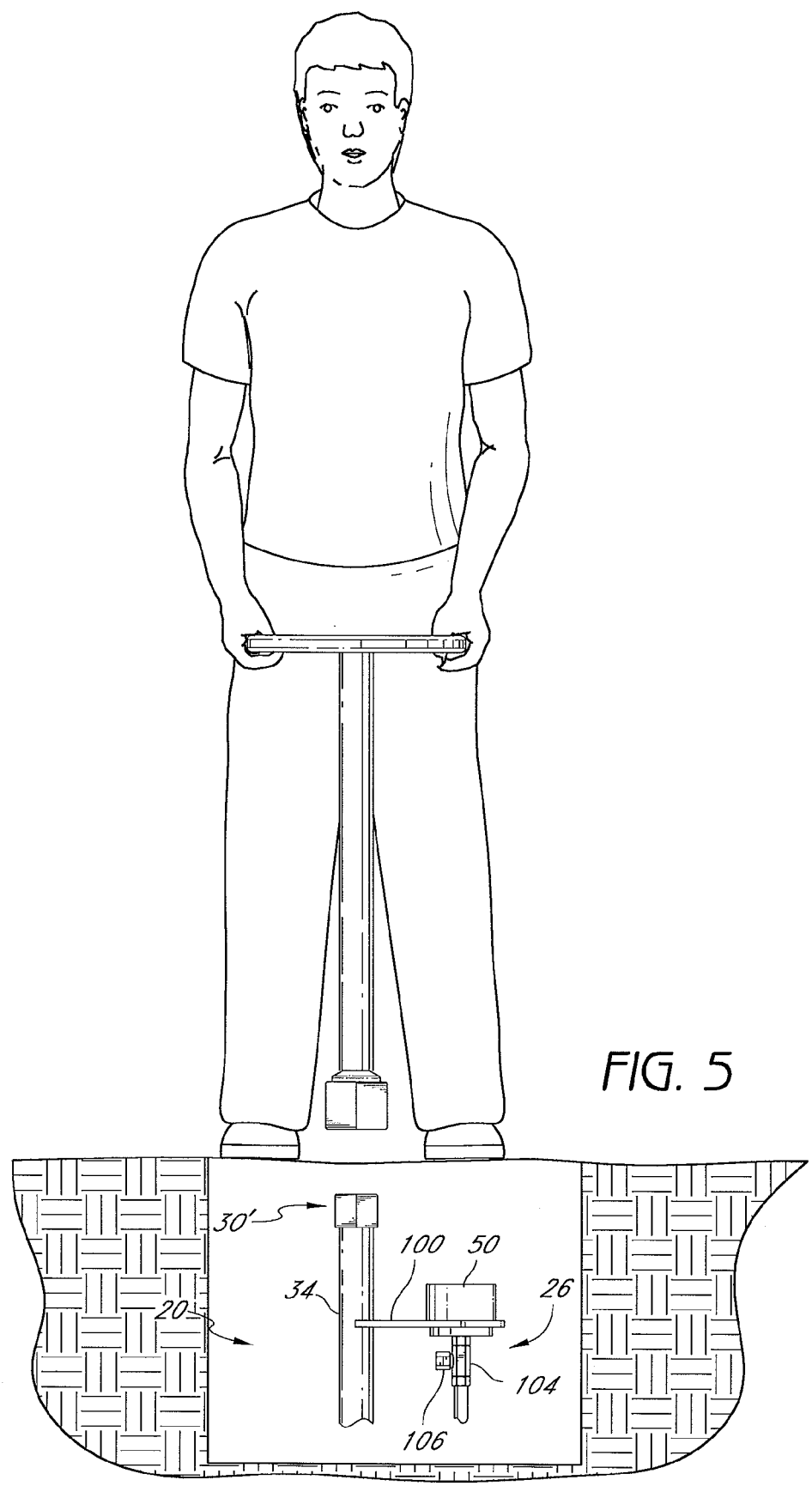
FIG. 5 is an elevation view showing another actuator mechanism.

In some configurations, such as that shown in FIG. 5, the wheel 30 can be replaced by a driven member 30'. In the illustrated arrangement, the driven member 30' is a square component. In one preferred configuration, the driven member 30' is a 2 inch square component. Other sizes and shapes can also be used. A manual wrench can be used to turn the driven member 30'. In some arrangements, the manual wrench can be replaced by a powered wrench, such as a pneumatic, electric or hydraulic wrench for instance, that can be used to turn the driven member 30' such that the valve can be opened and closed.

The shaft 32 extends through a protective sleeve 34. The inner surface of the sleeve 34 is spaced from the shaft 32 by a suitable distance. The sleeve 34 is designed to be buried in the ground and can be formed of any suitable material. In some applications, the sleeve 34 is formed of steel tubing. The length of the sleeve 34 depends, in large measure, upon the length of the shaft 32. The shaft 32 can have any desired length and can be supported within the sleeve 34 in any suitable manner, if needed.

A lower end of the illustrated sleeve 34 comprises a coupling housing 36. While not illustrated, the coupling housing accommodates a coupling between the shaft 32 and an input shaft of a gearing assembly 40. Any suitable coupling can be used. In some configurations, the coupling can be omitted and the shaft 32 can be an input shaft 38 of the gearing assembly 40.

Figure 3:
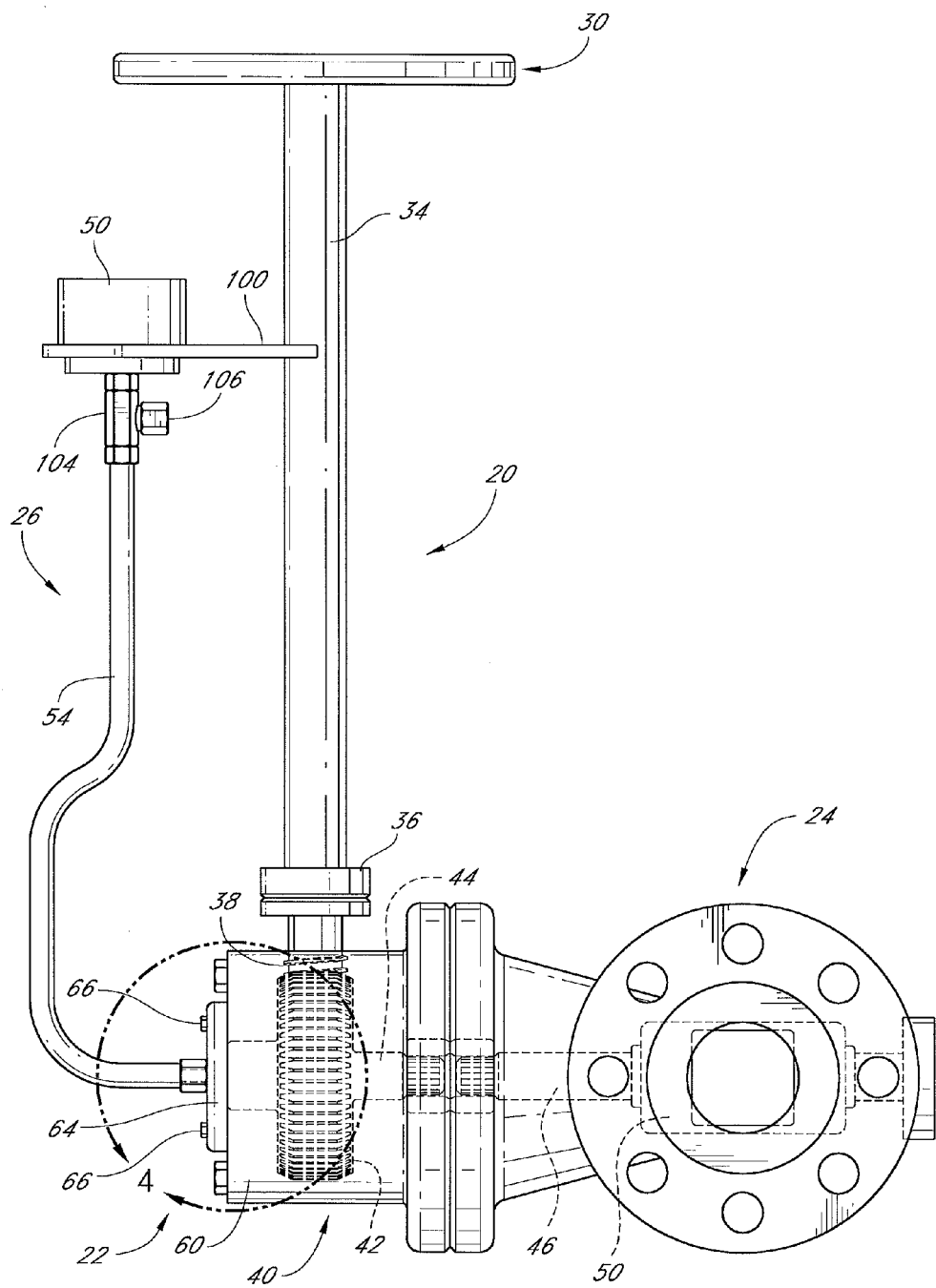
FIG. 3 is a partially sectioned side elevation view of the assembly of FIG. 1.

With reference now to FIG. 3, the input shaft 38 of the gearing assembly 40 can comprise a worm gear. The worm gear can be designed to mesh with a suitably sized gear 42. The gear 42 can be keyed or otherwise suitably secured to an output shaft 44. The output shaft 44 can be coupled with a valve shaft 46 in any suitable manner. In some configurations, the output shaft 44 can be the valve shaft 46. The valve shaft 46 carries the occluding element 50 of the valve 24 such that rotation of the valve shaft 46 results in movement of the occluding element 50 of the valve 24. In some applications, the occluding element 50 can be a plug or a ball. Other suitable configurations also can be used.

Other types of actuators also can be used. For instance, a slotted lever type of actuator can be used where a slider nut moves along a screw rod that is coupled to the shaft 32 and the slider nut moves inside a yoke defined in a lever such that as the slide nut moves down the screw rod and within the yoke, the lever rotates the valve shaft to which it is joined. Another configuration makes use of a dual link in which one of two links translates along the screw rod due to rotation of the screw rod and as one end of the first link translates, the second link turns the valve shaft through its quarter-turn sweep. These constructions and others are well known and any other suitable configurations also can be used, Each of the components described above are well known and further details of these components do not need to be described to enable one of ordinary skill in the art to make and use the present invention.

As illustrated, the position indicator 26 comprises three main components: a dial indicator 50, a drive link 52 between the dial indicator 50 and the valve shaft 46 and a protective housing 54 for the drive link 52. Unless otherwise apparent, the term valve shaft as used herein should be construed broadly to include any shafts (e.g., 44) that are directly coupled to the true valve shaft (e.g., 46), such as by a spline coupling, a pin coupling or any other suitable coupling keeping in mind the goal of joining a remote dial indicator 50 to the valve shaft 46 such that the true rotational orientation of the valve shaft 46 can be identified even if the actuator assembly fails.

Figure 4:
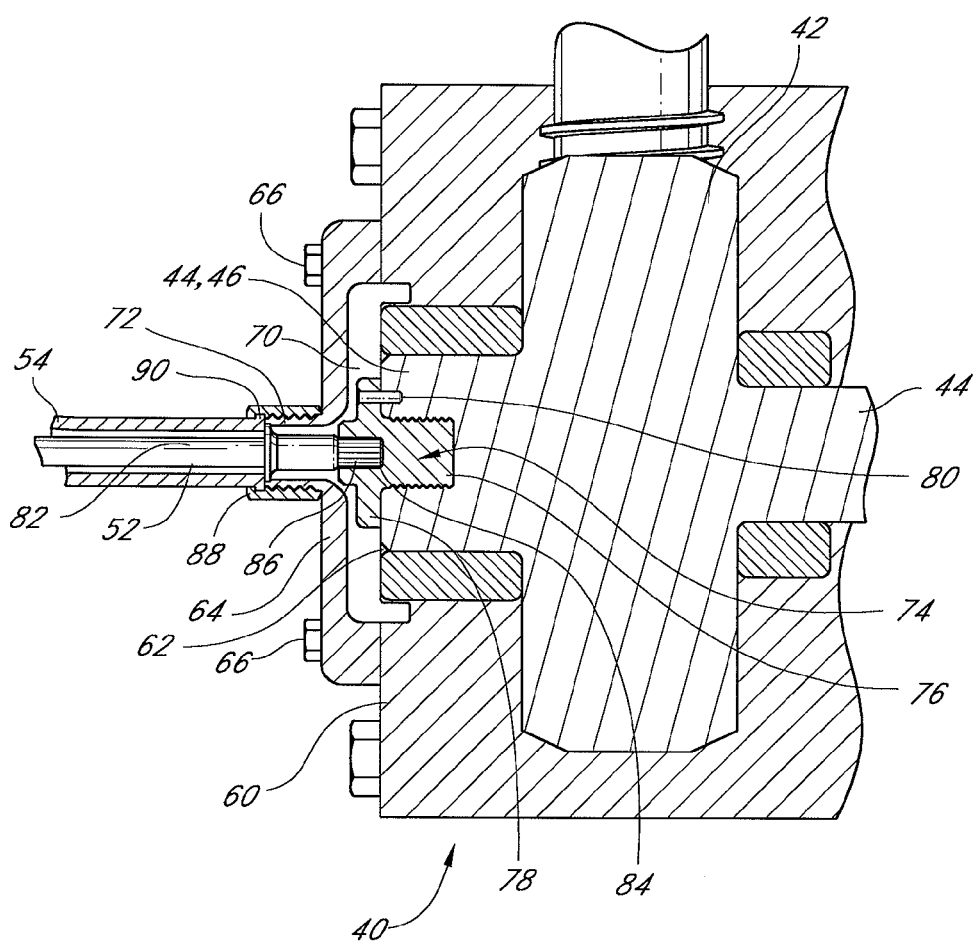
FIG. 4 is an enlarged view of a portion of FIG. 3 that is indicated by the circle 4-4 in FIG. 3.

With reference now to FIG. 4, the drive link 52 is secured to the valve shaft 44, 46 such that the drive link 52 will rotate directly with the rotation of the valve shaft 44, 46. The valve shaft 44, 46 is mounted within a housing 60. The housing 60 preferably comprises an access opening 62 that allows access to the valve shaft 44, 46. A cover plate 64 can be removably positioned over the opening 62. In some applications, an interface between the cover plate 64 and the housing 60 is substantially sealed to reduce the likelihood of fluid infiltrating into the gearing assembly 40. In the illustrated arrangement, a plurality of threaded fasteners 66 can be used to secure the cover plate 64 to the housing 60.

The cover plate 64 can comprise a recessed portion 70 on one side and a threaded coupling 72 on the opposite side. The recessed portion 70 defines a coupling chamber together with the housing 60. The recessed portion 70 can be sized and configured to readily accommodate a mounting fixture 74. The illustrated mounting fixture 74 comprises a threaded post 76 and a positioning flange 78. The threaded post 76 can be threaded into a female threaded aperture formed along the centerline of the valve shaft 44, 46. Preferably, the threaded post 76 is tightened into the valve shaft 44, 46 until the flange 78 abuts the end of the valve shaft 44, 46. Once the mounting fixture 74 is suitably positioned in the valve shaft 44, 46, one or more roll pin 80 or other keying component can be inserted through the flange 78 and into the valve shaft 44, 46. In one configuration, the apertures into which the pin 80 is inserted are formed after the mounting fixture 74 is threaded into the valve shaft 44, 46 (e.g., the apertures are drilled through the flange 78 and into the shaft 44, 46).

Other suitable techniques for securing the mounting fixture 74 to the valve shaft 44, 46 also can be used. For instance, but without limitation, the mounting fixture 74 can be nitrogen press fit into the valve shaft 44, 46. Desirably, even in such configurations, the mounting fixture 74 still is pinned into position at an eccentric location relative to the rotational axis to reduce or eliminate the likelihood that the mounting fixture will rotate relative to the valve shaft.

The drive link 52 can have any suitable configuration. In one assembly, the drive link 52 is a braided cable that resists torsional deflection. For example, a cable such as that used for a speedometer can be used. A distal end 82 of the drive link 52 can be coupled to the mounting fixture 74 in any suitable manner. In some configurations, the distal end 82 slips over a portion of the mounting fixture 74 such that the rotation of the mounting fixture 74 will cause rotation of the drive link 52. For instance, the mounting fixture 74 can comprise a hexagonal, square or the like protrusion to which a corresponding sleeved component of the drive link 52 can be mounted. In the illustrated configuration, the mounting fixture 74 comprises a splined aperture 84 and the ultimate distal end of the drive link 52 comprises a corresponding splined tip 86. With the tip 86 inserted into the aperture 84, the drive link 52 will rotate together with the mounting fixture 74, which rotates with the valve shaft 44, 46.

Any suitable configuration for securing the coupling between the mounting fixture 74 and the drive link 52 can be used. In one configuration, a snap ring can be positioned within a groove to lock the tip 86 of the drive link 52 in position. In another configuration, a set screw can be used to secure the end of the drive link 52 to the mounting fixture 74 (e.g., where the drive link 52 slips over the mounting fixture 74). In the illustrated configuration, a threaded sleeve 88 both joins the protective housing 54 to the cover plate 64 and secures the axial position of the tip 86. Preferably, sufficient clearance is maintained between an enlarged portion of the tip 86 and the sleeve 88 to allow relatively free rotation of the drive link 52. As shown, the ultimate distal end of the housing 54 comprises a flange 90 and the flange is captured by the threaded sleeve 88. The flange 90 also bears against a proximal end of the distal tip 86 such that the tip 86 is axially secured relative to the mounting fixture 74.

The protective housing 54 can be formed in any suitable manner. In one configuration, the protective housing 54 is formed of bendable stainless steel tubing. Other suitable materials also can be used. In one configuration, the protective housing 54 is sized to allow relatively free rotation of the drive link 52 within the protective housing 54.

The dial indicator 50 can be mounted in any suitable manner and at any suitable location. In the illustrated arrangement, the dial indicator 50 is mounted to a bracket 100. The bracket 100 is welded or otherwise suitably secured to the sleeve 34. The dial indicator can be mounted to the bracket 100 in any suitable manner and the techniques with which automotive gauges are mounted can be used.

A proximal end 102 of the housing 54 is coupled to at least one of the dial indicator 50 and the bracket 100. In the illustrated arrangement, a fitting 104 is secured to the dial indicator 50 and/or the bracket 100 and the proximal end 102 of the housing 54 is coupled to the fitting 104. The proximal end of the drive link 52 is connected to the needle or other indicator element in any suitable manner.

The fitting 104 comprises a capped port 106. The capped port 106 preferably comprises a threaded opening and a plug or cap. While not clearly shown in the present drawings, the port 106 is fluidly connected to the housing of the gear assembly 40 through the housing 54. The fluid connection allows a user to remove the cap and check for fugitive emissions from the pipe line in which the assembly 20 has been installed. Thus, the assembly 20 advantageously provides a reliable position indicator as well as a method of checking for fugitive emissions.

While the illustrated configuration comprises a dial indicator 50, it is contemplated that a digital readout also can be used. Furthermore, similar to the digital readout, a sensor can be used to detect the valve position and the sensor can broadcast or otherwise transmit output identifying the valve and the respective valve position. Moreover, in some configurations, the indicator 50 can be replaced by a green/black/red indicator that is black when the valve is between positions but green when it is open and red when it is closed. Other colors or indicators also can be used.

In use, once the assembly has been installed, a user operates the valve through any suitable actuator. As actuator turns the valve shaft, a direct reading of the actual rotational orientation of the valve shaft (and therefore the valve) can be obtained. In addition, the gear box can be checked for fugitive emission through the breather port.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A valve position indicator comprising a gauge, the gauge being supported by a bracket, a tubular housing having a first end connected to the gauge and a second end connected to a valve assembly, the valve assembly comprising a valve shaft, a drive link being positioned within the tubular housing, a first end of the drive link being connected to an indicator of the gauge and a second end of the drive link being directly coupled to the valve shaft such that rotation of the valve shaft results in direct rotation of the drive link.

2. The valve position indicator of claim 1 further comprising a coupling positioned between the first end of the tubular housing and the gauge.

3. The valve position indicator of claim 2, wherein the coupling comprises a port and the port is closable with a cap.

4. The valve position indicator of claim 3, wherein the valve assembly comprises a gear box and the port is in fluid communication with the gear box such that fugitive emissions that may be present in the gear box can be detected through the port.

5. The valve position indicator of claim 1, wherein the second end of the drive link is threaded into the valve shaft.

6. The valve position indicator of claim 5, wherein the second end of the drive link is pinned to the valve shaft at an eccentric location such that the second end of the drive link cannot rotate relative to the valve shaft.

7. The valve position indicator of claim 1, wherein the valve assembly comprises a gear box with an access opening, a cover plate is positioned over the access opening and an interface between the gear box and the cover plate is substantially sealed.

8. The valve position indicator of claim 1, wherein the second end of the drive link is coupled to the valve shaft with a mounting fixture, the mounting fixture being joined to the valve shaft in such a manner that the mounting fixture cannot rotate relative to the valve shaft.

9. The valve position indicator of claim 8, wherein the mounting fixture comprises a protrusion and the second end of the drive link slides over the protrusion.

10. The valve position indicator of claim 9, wherein the protrusion has a hexagonal configuration.

11. The valve position indicator of claim 8, wherein the mounting fixture comprises an aperture and the second end of the drive link slides into the aperture.

12. The valve position indicator of claim 11, wherein the aperture and the second end of the drive link are coupled by splines.

13. The valve position indicator of claim 1, wherein the indicator of the gauge is a needle that pivots between an opened indicator position and a closed indicator position.

* * * * *